R. L. SHAMBAUGH.
EMERGENCY HUB.
APPLICATION FILED JULY 8, 1918.
1,300,034.
Patented Apr. 8, 1919.
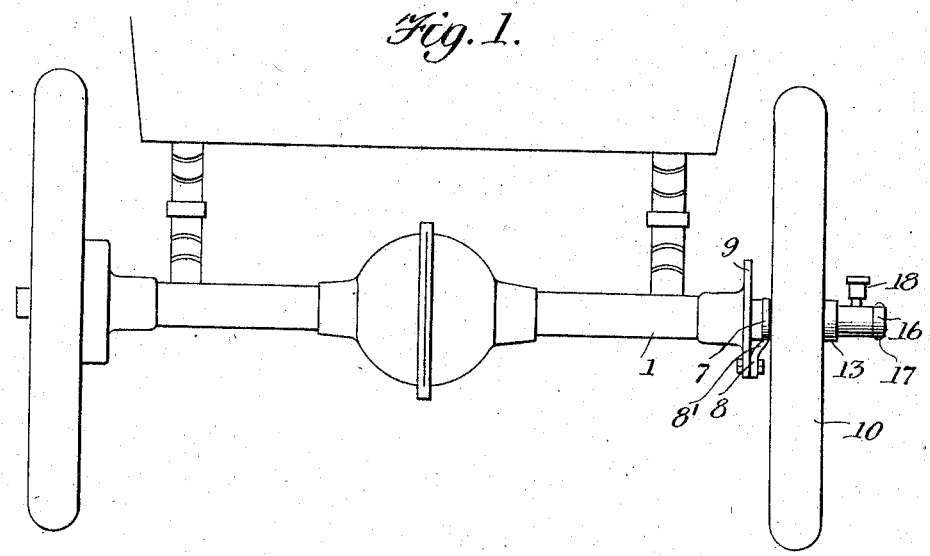
Fig. 1.
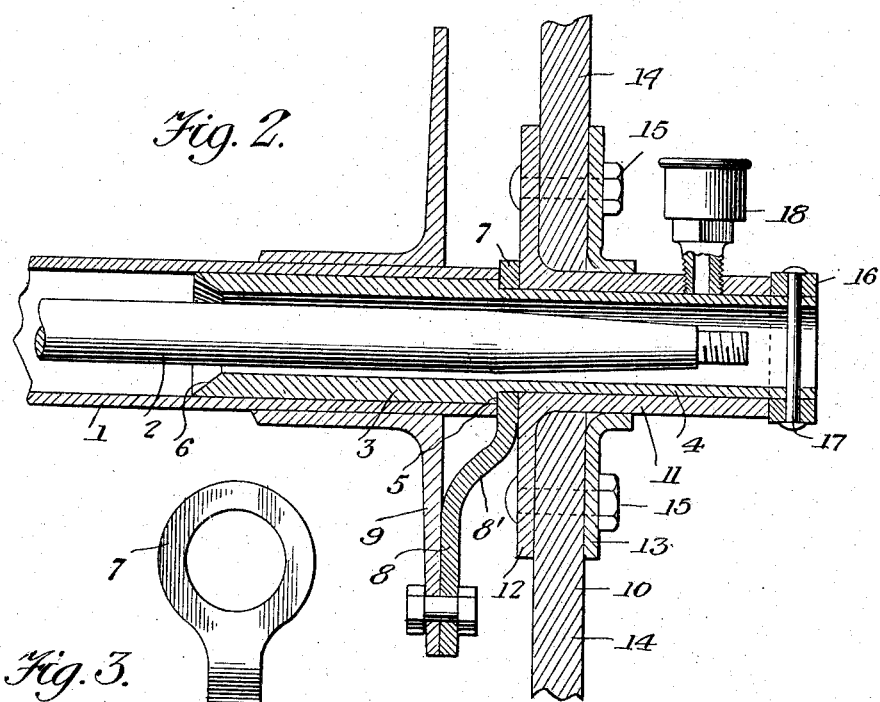
Fig. 2.
Fig. 3.
Witness
T. H. Parnell
L. B. Middleton
Inventor
R. L. Shambaugh
By Victor J. Evans
Attorney

UNITED STATES PATENT OFFICE.

RAYMOND LYNN SHAMBAUGH, OF LA FAYETTE, INDIANA.

EMERGENCY-HUB.

1,300,034. Specification of Letters Patent. Patented Apr. 8, 1919.

Application filed July 8, 1918. Serial No. 243,786.

*To all whom it may concern:*

Be it known that I, RAYMOND L. SHAMBAUGH, a citizen of the United States, residing at La Fayette, in the county of Tippecanoe and State of Indiana, have invented new and useful Improvements in Emergency-Hubs, of which the following is a specification.

This invention relates to new and useful improvements in emergency wheels and the principal object of the invention is to provide a wheel with means for securing it to the axle housing of an automobile to replace the regular wheel if an accident should happen to the same or to the axle thereof.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a rear view of part of an automobile with my invention in place.

Fig. 2 is a longitudinal section.

Fig. 3 is a detail view of the ring member for holding the sleeve in place.

As shown in these views 1 indicates the axle housing of the automobile and 2 is the axle. The end of the axle carries the ordinary automobile wheel. As before stated my invention is to provide an emergency wheel and hub for replacing such wheel when the axle or the differential should become damaged to such an extent as to prevent the use thereof. It is well known that when the axle breaks, presumably from crystallization, the rupture takes place in the end of the housing. When this happens, or when for any reason it is impossible to use the axle the ordinary wheel is removed and my invention applied. The invention consists of a sleeve 3 having a reduced outer part 4 which forms a shoulder 5 at the junction of said reduced part with the other part. The inner end of said sleeve is counter-bored as at 6. The main part of the sleeve is inserted within the housing with the shoulder 5 in line with the end of said housing. The sleeve is held in the housing by means of a ring member 7 having a stem 8 which is bolted to the flange 9 of the housing. The ring part engages with the shoulder 5 and with the end of the housing. The stem 8 has an inclined part 8' where it connects with the ring so that said ring is to one side of the longitudinal plane of the stem. The reduced part 4 of the sleeve forms an axle for the emergency wheel 10. Said wheel consists of a bushing 11 which surrounds the part 4 and is provided with a flange 12 at one end which coöperates with a second flange 13 to hold the spokes 14 in place. Said flanges are bolted together by means of the bolts 15. As will be seen from the drawings the bushing 11 is of considerably greater length than the width of the wheel and its outer end engages a collar 16 secured to the end of the part 4 by means of a pin 17. 18 indicates the grease cup carried by the bushing 11 whereby the part 4 may be lubricated.

It will be seen that the emergency wheel may be quickly and easily applied to the housing so that the automobile may be towed to a repair shop without using the axle 2.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What is claimed is:—

A device of the class described comprising a sleeve hollow throughout and having a reduced part forming a shoulder at the junction thereof with the main part, a ring shaped member engaging with said shoulder for holding the main part of the sleeve within the axle housing of an automobile, a stem on said member adapted to be secured to the flange of the housing, a wheel, a bushing connected with the hub thereof and engaging the reduced part of the sleeve and means for holding said bushing on said reduced part.

In testimony whereof I affix my signature.

RAYMOND LYNN SHAMBAUGH.

Copies of this patent may be obtained for five cents each, by addressing the "Commissioner of Patents, Washington, D. C."